J. S. POPE.

Feed Trough.

No. 65,004.

Patented May 21, 1867.

Witnesses:
J. H. Burridge
Frank S. Alden

Inventor:
J. S. Pope

United States Patent Office.

J. S. POPE, OF NAPOLEON, OHIO.

Letters Patent No. 65,004, dated May 21, 1867.

HOG-FEEDER.

*The Schedule referred to in these Letters Patent and making part of the same.*

TO ALL WHOM IT MAY CONCERN:

Be it known that I, J. S. POPE, of Napoleon, in the county of Henry, and State of Ohio, have invented certain new and useful improvements in Hog-Feeders; and I do hereby declare that the following is a full and complete description of the construction of the same, reference being had to the accompanying drawings making a part of this specification, in which—

Figure 1:
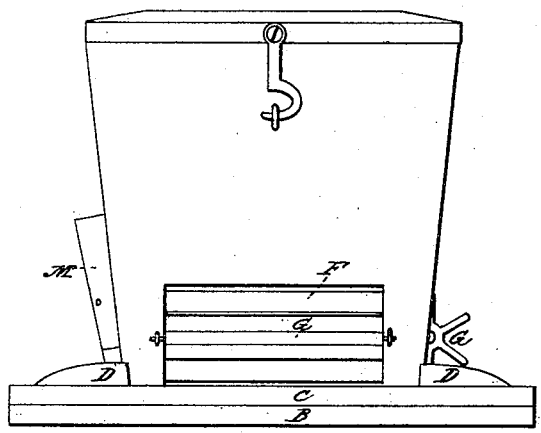
Figure 2:
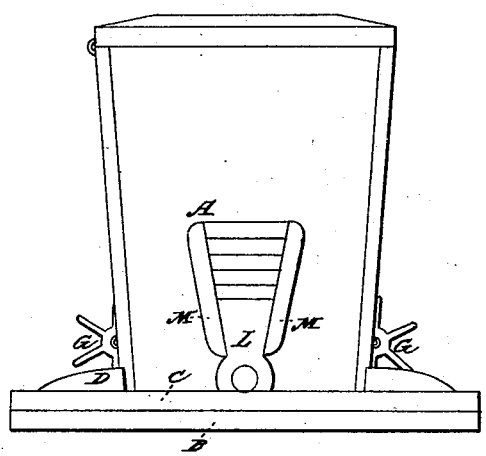
Figure 3:
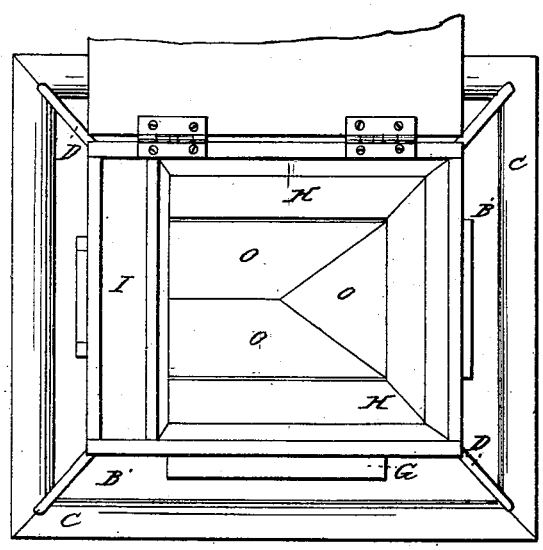
Figure 4:
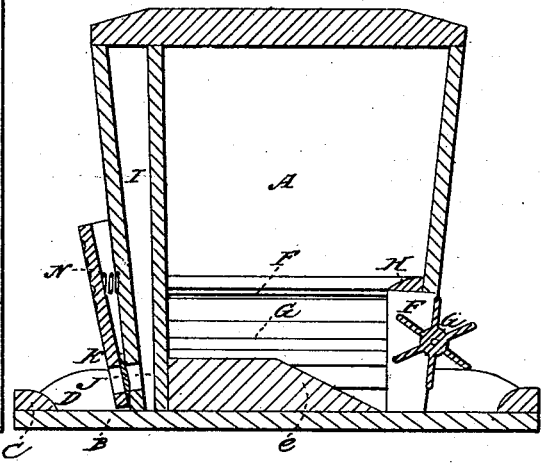

Figure 1 is a front view of the feeder.
Figure 2 is a side view.
Figure 3 an inside view from the top.
Figure 4 is a vertical section.
Like letters of reference refer to like parts in the views.

A, fig. 1, is a box, the capacity of which being according to the number of hogs. The bottom of this box consists of a broad platform, B, extending every way beyond the box, the sides of which are provided with a raised rim, C, making by this means a kind of trough, B', around the box, from which the animals feed, as will hereafter be shown. D are braces, the purpose of which is to aid in securing the tank from being displaced, and to divide the trough into sections and prevent the swine from overcrowding while feeding. In three sides and near the bottom of the box are cut three openings, F, in which are hung the wheels G, the arms or wings of which on the inside are covered by a shelving projection, H; the purpose of these wheels and shelves will hereafter be shown. It will be observed that one end of the box is partitioned off into a narrow compartment, I, figs. 3 and 4, having an outlet, J, at the bottom, which outlet is stopped by a valve, K, attached to the triangular lever L, pivoted between the cheeks of the cleats M. Between the upper arm of the lever and box is introduced a spring, N, fig. 4, and by which the valve alluded to is kept closed. The upper spreading end of the lever is coarsely corrugated, as seen in fig. 2.

Having thus indicated the several parts of the feeder and their respective disposition, the manner of using the same is as follows:

The dry feed is thrown into the larger compartment of the box, and the smaller one, I, is filled with water or other liquid food. The meal will work out under the wheel into the trough at which the swine are supposed to be feeding. Should the feed not come out fast enough to supply the hungry brutes, the quantity is increased by turning the wheel, which the hogs will soon learn to do with their snouts. The rotation of the wheel will either carry the feed over to the trough between the wings of the wheel, or on reversing its rotation the wings will draw it out under into the trough; at the same time the wheel will effectually prevent an excess of feed from passing out; hence the supply being only as the wheel is made to rotate, and thereby bring out the feed. The wheel is prevented from being overloaded by the shelving projections referred to, which, covering the wheel, allow the feed to approach it only at the breast or side; therefore the wheel is at all times free to rotate in either direction. It will be seen that the bottom of the box is provided with central inclined planes O, one descending toward each wheel, the purpose of which is to throw the feed from the centre of the box against the wheel, and thereby keep it at all times ready to be conveyed out to the porkers. In order to supply the animals with water or other liquid food, the reservoir I is filled with the same, and the hogs allowed to help themselves by pressing their noses against the corrugated end of the lever L, which will open the valve K, and the water will flow out into the trough immediately below.

What I claim as my improvement, and desire to secure by Letters Patent, is—

1. The wheel G, as arranged in combination with the box A and trough B, as and for the purpose described.

2. The valve K, as arranged and operated by the lever L, in combination with the reservoir I and trough, for the purpose and in the manner as set forth.

J. S. POPE.

Witnesses:
    J. M. HAAG,
    J. C. SAUR.